United States Patent
Buisman et al.

(10) Patent No.: US 6,223,905 B1
(45) Date of Patent: May 1, 2001

(54) PARTICLE SEPARATOR INCLUDING CONTINUOUS TRAIN OF SEPARATING PANS

(76) Inventors: Reindert Buisman, 2 Lark Crescent, Gauteng (ZA); Werner Hartmut Altmann, Tobelmühle, Bischofszell (CH)

( * ) Notice: Subject to any disclaimer, the term of this patent is extended or adjusted under 35 U.S.C. 154(b) by 0 days.

(21) Appl. No.: 09/053,503

(22) Filed: Apr. 1, 1998

(30) Foreign Application Priority Data

| Apr. 1, 1997 | (ZA) | 97/2753 |
| Jul. 24, 1997 | (ZA) | 97/6590 |
| Dec. 19, 1997 | (ZA) | 97/11427 |
| Dec. 19, 1997 | (ZA) | 97/11428 |

(51) Int. Cl.[7] .............. B07B 1/28; B07B 1/00
(52) U.S. Cl. .......... 209/261; 209/242; 209/272; 209/307
(58) Field of Search .............. 209/240, 241, 209/242, 254, 917, 255, 257, 261, 272, 243, 307, 405, 390; 198/848

(56) References Cited

U.S. PATENT DOCUMENTS

| 449,942 | * | 4/1891 | Merralls | 209/272 |
| 889,673 | * | 6/1908 | Franz | 209/307 |
| 967,008 | * | 8/1910 | Franz | 209/307 |
| 1,019,041 | * | 3/1912 | Green | 209/307 |
| 1,059,129 | * | 4/1913 | Edwards et al. | 209/241 |
| 1,215,596 | * | 2/1917 | Wescott | 198/495 |
| 1,401,571 | | 12/1921 | Avery . | |
| 1,706,428 | | 3/1929 | Ward . | |
| 1,724,150 | * | 8/1929 | Webb | 198/834 |
| 1,801,034 | * | 4/1931 | Bunce | 209/257 |
| 2,053,038 | * | 9/1936 | Mackenzie | 209/335 |
| 2,062,779 | | 12/1936 | Congable . | |
| 2,104,785 | * | 1/1938 | Akeyson | 209/308 |
| 2,286,332 | * | 6/1942 | Sleyer | 209/849 |
| 2,312,675 | * | 3/1943 | Scheiding | 209/272 |
| 2,367,964 | * | 1/1945 | Ross | 209/307 |
| 2,581,289 | | 1/1952 | Prevost . | |
| 2,609,925 | * | 9/1952 | Weisz | 209/2 |
| 3,252,691 | * | 5/1966 | Getzin et al. | 198/494 |
| 3,621,997 | * | 11/1971 | Hobbs | 209/681 |
| 3,682,303 | | 8/1972 | Feterl . | |
| 3,939,077 | | 2/1976 | Seibert . | |
| 3,968,033 | | 7/1976 | Illemann et al. . | |
| 4,188,294 | | 2/1980 | Hagihara . | |

(List continued on next page.)

FOREIGN PATENT DOCUMENTS

| 021576 | | 1/1981 | (EP) . | |
| 197802 | * | 3/1978 | (FR) | 209/243 |
| 367144 | | 1/1931 | (GB) . | |
| 367144 | * | 2/1932 | (GB) . | |
| 2103559 | | 2/1983 | (GB) . | |
| 392954 | | 12/1973 | (SU) . | |
| WO 93/22028 | | 11/1973 | (WO) . | |

Primary Examiner—Donald P. Walsh
Assistant Examiner—Daniel K Schlak
(74) Attorney, Agent, or Firm—Kenyon & Kenyon

(57) ABSTRACT

A separator 10 is disclosed and claimed. The separator includes a continuous separating assembly 20 following a trajectory having a top run $\underline{A}$ and a return run $\underline{B}$. The assembly includes a train of articulated pan assemblies 22.1 to 22.n. Each pan assembly includes first and second back-to-back pans 22.11 and 22.12 separated by a discrete mesh segment 60.1. In use, the separator is charged with a mixture including a liquid, a first solid particulate component and a second solid particulate component of which the particles are bigger than the first particulate component, both at the start 26 of the top run and at the start 28 of the return run. The first particulate component is received in sumps 30,32 and 34,36 and the second particulate component is collected in collection regions 42 and 46.

32 Claims, 15 Drawing Sheets

U.S. PATENT DOCUMENTS

| | | |
|---|---|---|
| 4,307,064 | 12/1981 | Barger et al. . |
| 4,366,628 * | 1/1983 | George ................................ 198/561 |
| 4,518,494 * | 5/1985 | Jackson ............................... 210/158 |
| 4,692,240 | 9/1987 | Arbuthnot et al. . |
| 5,003,731 * | 4/1991 | Durr ..................................... 198/833 |
| 5,033,332 | 7/1991 | Riley . |
| 5,213,203 | 5/1993 | Kinney et al. . |
| 5,593,585 * | 1/1997 | Groetzinger ........................ 210/409 |

* cited by examiner

PARTICLE SEPARATOR INCLUDING CONTINUOUS TRAIN OF SEPARATING PANS

INTRODUCTION AND BACKGROUND

This invention relates to separators and more particularly to separators comprising an continuous separating assembly for separating out a first solid particulate component from a mixture thereof with a liquid and a second solid particulate component which is of bigger particle size than the first solid component.

In U.S. Pat. No. 4,692,240 assigned to Delkor Technik (Pty) Ltd there is disclosed a separator including an endless travelling cloth supported by a plurality of longitudinally spaced, parallel rollers. An important limitation of this separator is that it can be charged with the mixture along the top run only of the cloth. Furthermore, due to deformation of the cloth about the end rollers, very fine (i.e. in the order of minus 300 microns) screen material cannot be used with this separator.

OBJECT OF THE INVENTION

Accordingly, it is an object of the present invention to provide a separator, a separator assembly, and a method of separating with which the applicant believes the aforementioned disadvantages may at least be alleviated.

SUMMARY OF THE INVENTION

According to the invention there is provided a separator for separating out a first solid particulate component from a mixture thereof with a second solid particulate component which is of bigger particle size than the first solid particulate component, the separator including:

- a separating assembly including an articulated train of classifiers moving along a trajectory, each classifier including a first classifying element for allowing the first particulate component therethrough and for stopping the second particulate component;
- a first mixture feeding means for feeding the mixture onto the separating assembly;
- a first receiving means for receiving the first solid particulate component;
- the separating assembly extending between the first mixture feeding means and the first receiving means; and
- a first collection region located downstream along the trajectory from the first mixture feeding means, for receiving the second solid particulate component.

The train of classifiers may be mounted to move about first and second spaced support assemblies, so that the trajectory is a closed trajectory including a first elongate section extending from the first assembly to the second assembly; and a second or return section extending from the second assembly to the first assembly.

The first support assembly may include one of a sprocket assembly and a guide assembly; and the second support assembly may include a sprocket assembly.

The separating assembly may be mounted on a rectangular frame supporting the support assemblies, so that the first and second sections extend parallel to one another with the first section above the second section.

The first mixture feeding means may be provided above the first section towards the first support assembly and the first receiving means may include a plurality of transversely removable modular sumps provided between the first section and the second section.

The separator may further include a second mixture feeding means provided above the second segment towards the second support assembly; and a second receiving means including a plurality of transversely removable modular sumps provided below the second segment.

The mixture may, in use, be fed via the first and second mixture feeding means simultaneously, so that it is screened in either of the first and second segments of the trajectory and so that the first particulate component is received in either of the first and second sump arrangements.

The first and/or second mixture feeding means may include an elongate conduit defining a plurality of outlet ports spaced along the length thereof.

The conduit may be housed in an elongate housing having an open bottom; and an inverted V-shaped deflector may be mounted in the housing below the conduit, so that outlet channels onto the separating assembly are defined on either side of the deflector.

Each classifier in the train of classifiers may include a panel including a screen segment. However, preferably each classifier in the train of classifiers includes a pan assembly including first and second back-to-back pans separated by the first classifying element.

The first classifying element of each pan assembly may include a fine screen segment.

The first and second pans of each pan assembly may further include a coarser screen segment spaced from said first fine screen segment and extending substantially parallel to said first fine screen segment.

The pan assemblies of the train of pan assemblies are preferably separated by transversely extending junction regions.

The first fine screen segment of each pan assembly may form part of a modular screen unit which is removably receivable between two adjacent junction regions. The modular screen unit may include the first fine screen segment and tightening means for the screen segment secured or securable to the segment and manipulatable to cooperate with a wall of the pan assembly to tighten the segment.

The tightening means may include at least one elongate curved hook formation secured to a peripheral region of the segment and at least one inflatable member locatable in a channel defined by the elongate hook formation so that, in use, it is located between the hook formation and the wall of the pan assembly and so that upon inflation of the inflatable member, the segment is tightened in the pan assembly.

The frame of the separator may include first and second tracks extending along said first and second sections respectively of the trajectory. Each track may include transversely spaced longitudinally extending first and second elongate track elements and the separator assembly may be supported on the tracks by spaced wheels mounted on a continuous train of axles. Each track element may provide undulations thereon and the undulations on the first track element of each track is preferably out of phase with the undulations of the second track element of that track, thereby to rock the separating assembly and agitate the mixture thereon, in use.

The frame of the separator may further include agitating sprayers along the first and second sections of the trajectory for agitating the mixture on the separating assembly.

Adjacent axles in the continuous train of axles may be linked to one another by link elements extending between the adjacent axles. Preferably, first and second link elements are provided between end regions of first and second adjacent axles to link the end regions thereof. Each link element may include first and second bushes towards first and second ends thereof for respectively receiving said first and second axles.

The first and second pans respectively of each pan assembly may include transversely spaced first and second side walls. The first side wall of the first pan may removably be secured to the first side wall of the second pan and the second side wall of the first pan may removably be secured to the second side wall of the second pan.

The first and second side walls of the first pan and the first and second side walls of the second pan may permanently be secured at their respective ends to respective transversely extending leading and trailing end walls of the first and second pans. The side walls may be welded to the ends walls.

The first and second side walls of the second pan of each pan assembly are preferably removably secured to the link elements, thereby to secure the separator assembly to the link elements. Preferably, flanges on the first and second side walls of the second pan of each pan assembly are secured to flanges on the link elements.

A transversely extending weir element may be secured to the trailing end wall of each second pan of each pan assembly.

The frame of the separator may further include sprayers in the region of the first and second collection regions, to wash the second solid component off the assembly and into said first and second collection regions.

Also included within the scope of the invention is a separating assembly for a separator including a continuous train of articulated classifiers, each classifier including a first classifying element for allowing a first solid particulate component therethrough and for stopping a second particulate component which is of bigger particle size then the second particulate component.

Preferably each classifier in the train of classifiers includes a pan assembly including first and second back-to-back pans separated by the first classifying element.

Further included within the scope of the present invention is a separator for separating out a first solid particulate component from a mixture thereof with a second solid particulate component which is of bigger particle size than the first solid particulate component; the separator including:

a continuous separating assembly moving along a closed trajectory and having a top run and return run;

the separating assembly including classifier means for allowing the first particulate component therethrough and for stopping the second particulate component;

a first mixture feeding means for feeding the mixture onto a top surface of the top run of the assembly;

a first receiving means located below a bottom surface of the top run for receiving the first particulate component;

a second mixture feeding means for feeding the mixture onto a top surface of the return run of the assembly; and a second receiving means located below a bottom surface of the return run.

A first collection region for the second particulate component may be located downstream along the trajectory from the first mixture feeding means and a second collection region for the second particulate component may be located downstream along the trajectory from the second mixture feeding means.

The separating assembly may include a continuous train of articulated classifiers, each classifier including a first classifying element for allowing the first particulate component therethrough and for stopping the second particulate component.

Still further included within the scope of the present invention is a modular screen unit including a screen segment and tightening means for the screen segment secured to the segment and manipulatable to cooperate with a carrier for the unit to tighten the segment.

Also included within the scope of the present invention is a spray bar including a conduct having a side wall defining a bore, the spray bar further including at least one nozzle recessed into the side wall.

According to another aspect of the invention there is provided a method of separating out a first solid particulate component from a mixture thereof with a second solid particulate component which is of bigger particle size than the first solid particulate component, the method including the steps of:

providing a continuous separating assembly for passing the first particulate component and for stopping the second particulate component;

causing the assembly to travel along a closed trajectory so that it follows a first run and a return run;

from a first feeding means above the first run, feeding the mixture onto the assembly and collecting the first solid component between the first run and the return run;

collecting the second solid component downstream from the first feeding means;

at the same time and from a second feeding means between the first run and the return run, also feeding the mixture onto the assembly and collecting the first solid component on another side of the return run; and collecting the second solid component downstream from the second feeding means.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
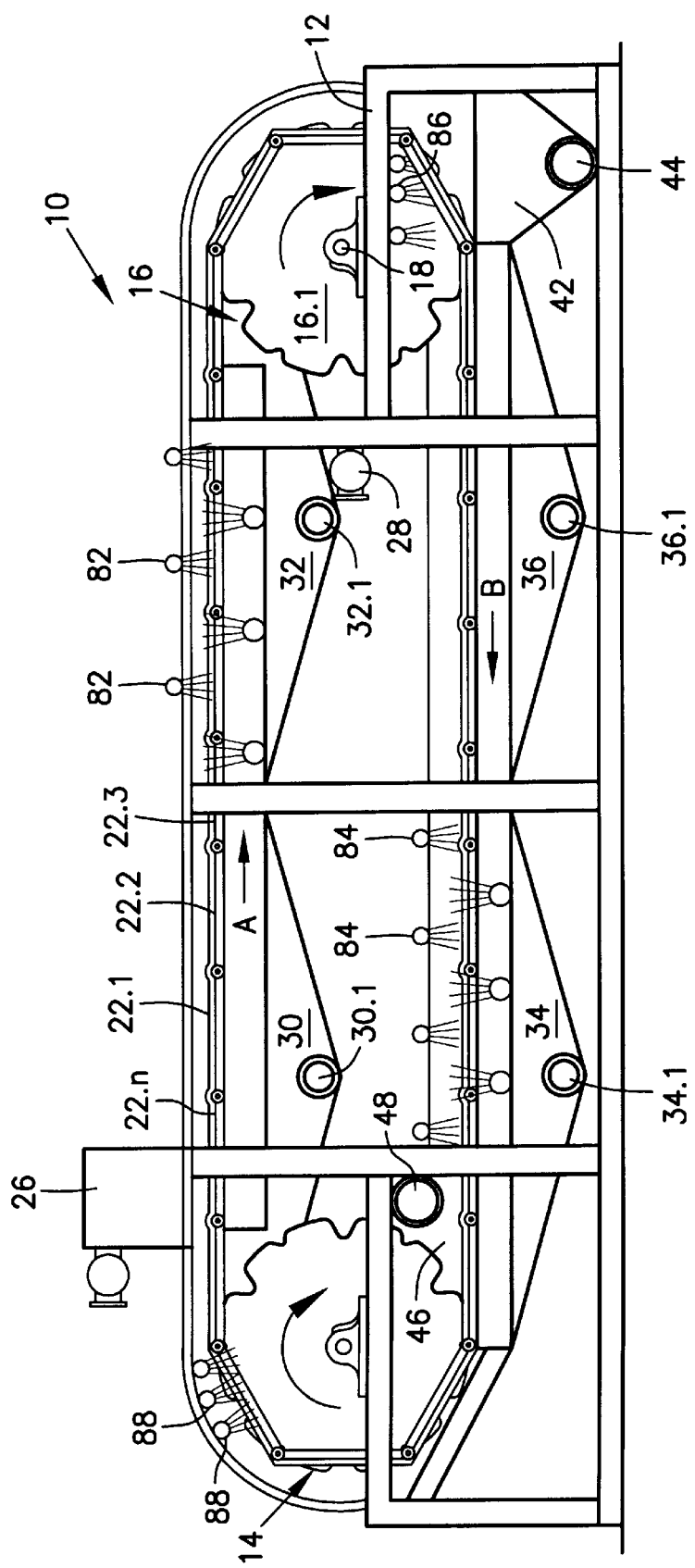
FIG. 1 is a diagrammatic side view of a separator according to the invention.
Figure 2:
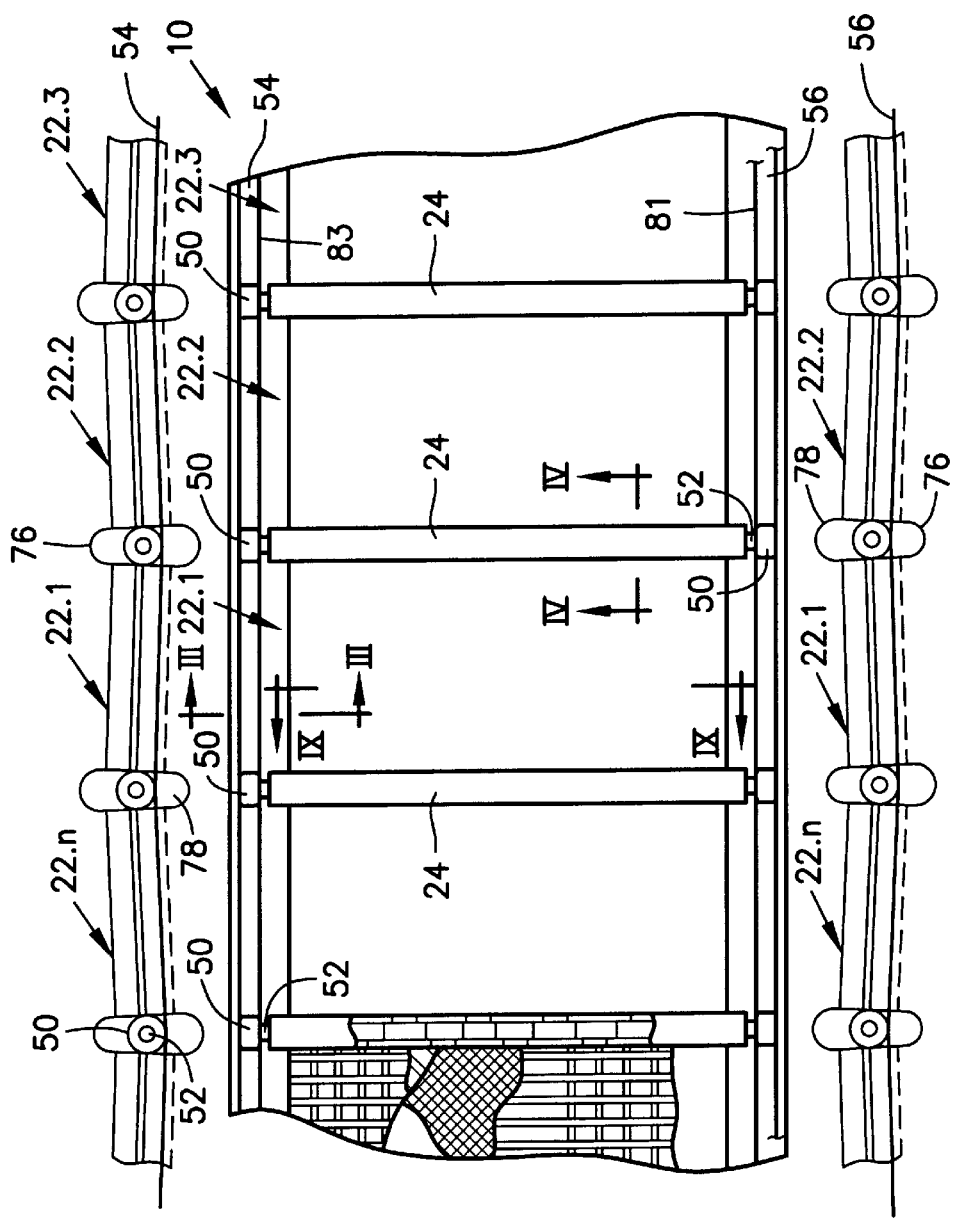
FIG. 2 is a diagrammatic plan view of part of the separator in FIG. 1, and diagrammatic side views of corresponding parts of parallel track elements of a track for wheels supporting a continuous separating assembly forming part of the separator according to the invention.
Figure 6:
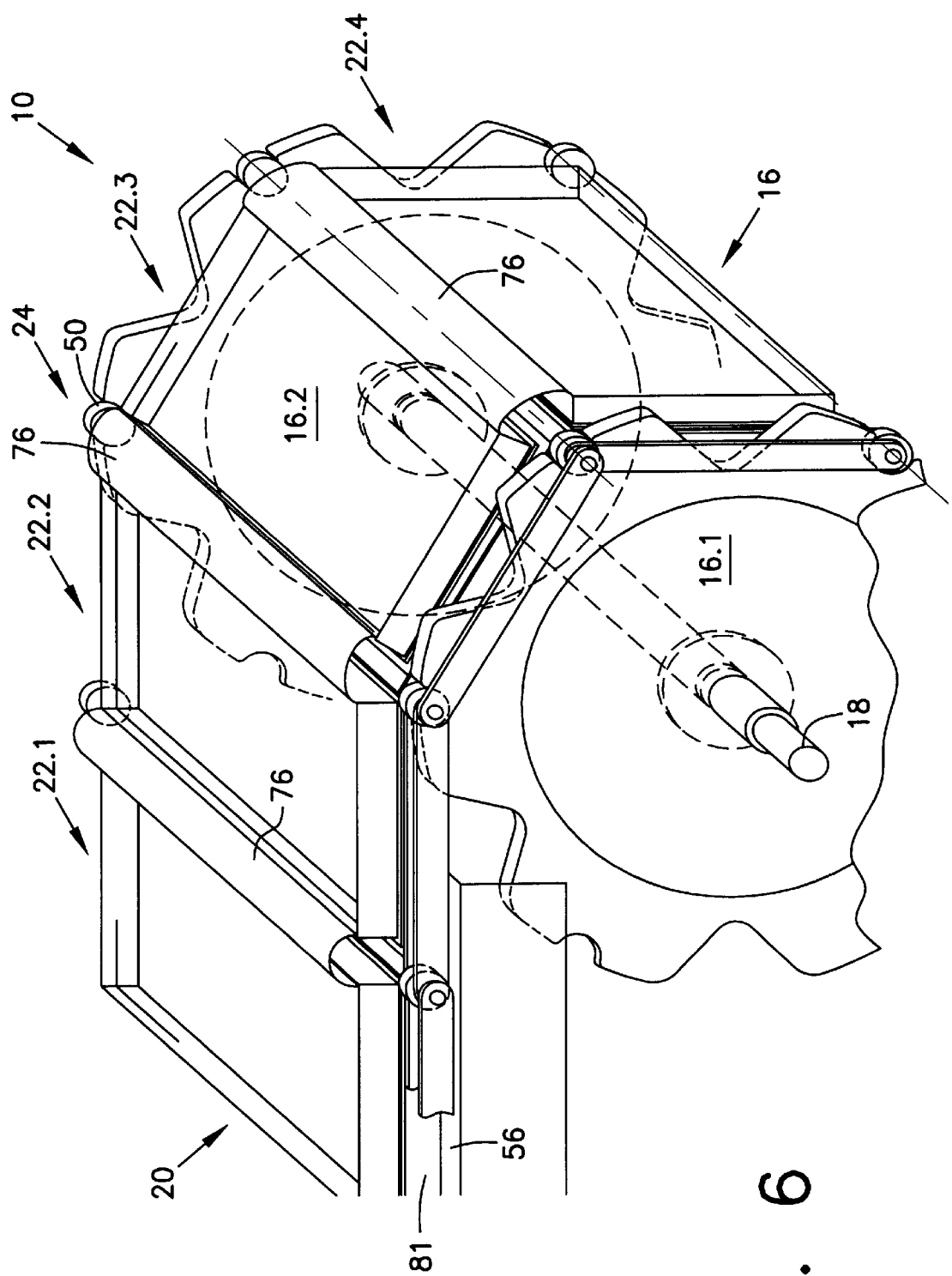
FIG. 6 is a diagrammatic perspective view of the separator in the region of a sprocket assembly for supporting and driving the separating assembly.

A separator according to the invention is generally designated by the reference numeral 10 in FIGS. 1, 2 and 6. The separator 10 serves to screen out a first solid particulate component from a mixture thereof with a liquid and a second solid particulate component which is of bigger particle size than the first solid component.

The separator 10 comprises an elongate frame 12 supporting first and second similar longitudinally spaced sprocket assemblies 14 and 16. The sprocket assemblies 14, 16 are identical. Referring to sprocket assembly 16, it comprises a first sprocket 16.1 and a second sprocket 16.2 (shown in FIG. 6) mounted in transversely spaced relation relative to the first sprocket on a common axle 18.

The sprocket assemblies support a separating assembly 20 comprising a continuous train of articulated classifiers in the form of similar separating pan assemblies 22.1 to 22.n. At least one of the sprocket assemblies (14,16) is driven by an electric motor to cause the separating assembly to follow in a clockwise direction C, a closed trajectory having a top section A and a bottom section B about the sprocket assemblies. In another embodiment (not shown), the classifiers may be in the form of similar panels, which are articulate together. Each panel includes a screen, sieve or the like for classifying the particles.

As best shown in FIG. 2, the pan assemblies 22.1 to 22.n are separated by similar junction regions 24.

The frame 12 further supports a first inlet or mixture feeding means 26 for the mixture to be separated, mounted above the top section A of the trajectory and a second mixture feeding means 28 above the bottom section B of the trajectory.

A first receiving means for the first particulate component in the form of a sump arrangement including transversely removable, open top modular sumps 30 and 32 is provided on frame 12 below top section A of the trajectory. Sumps 30 and 32 define outlets 30.1 and 32.1 respectively. Similarly, a second receiving means for the first particulate component in the form of a sump arrangement including transversely removable, open top modular sumps 34 and 36 is provided on the frame 12 below bottom section B of the trajectory. Sumps 34 and 36 define outlets 34.1 and 36.1 respectively.

A first open top collection region 42 for the second solid particulate component defining an outlet 44 is provided on the outside of the trajectory and between the spaced sprockets of sprocket assembly 16. A second open top collection region 46 for the second solid particulate component defining an outlet 48 is provided on the inside of the trajectory and between the spaced sprockets of sprocket assembly 14.

As shown in FIG. 2, the separating assembly 20 is supported on the frame 12 by spaced wheel pairs 50 connected by axles 52. The wheels 50 run on first and second transversely spaced upper track elements (54,56) in the top section A of the trajectory and on spaced first and second lower track elements (only one of which is shown in FIG. 1 at 58) in the bottom section B of the trajectory. As best shown in the top and bottom side views of FIG. 2, the track elements 54 and 56 provide undulating paths which are out of phase, to cause a rocking movement in the separating assembly 20, thereby to agitate the mixture in the pans of the separating assembly.

Figure 3:
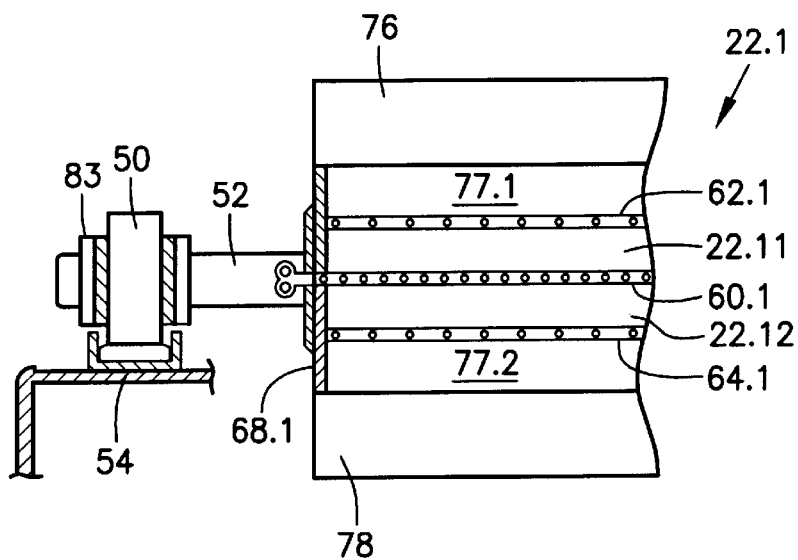
FIG. 3 is a diagrammatic sectional view on line III in FIG. 2.

As stated hereinbefore the pan assemblies 22.1 to 22.n are similar in configuration. Accordingly, only pan assembly 22.1 will be described in further detail with reference to FIG. 3. Pan assembly 22.1 comprises first and second back-to-back pans 22.11 and 22.12 facing in opposite directions and separated by a common first classifying element in the form of a fine stainless steel screen mesh segment 60.1. Spaced from fine screen segment 60.1 in pan 22.11 is a first coarse stainless steel mesh segment 62.1 and spaced from the fine screen segment 60.1 in pan 22.12 is a second coarse stainless steel mesh segment 64.1.

Figure 4:
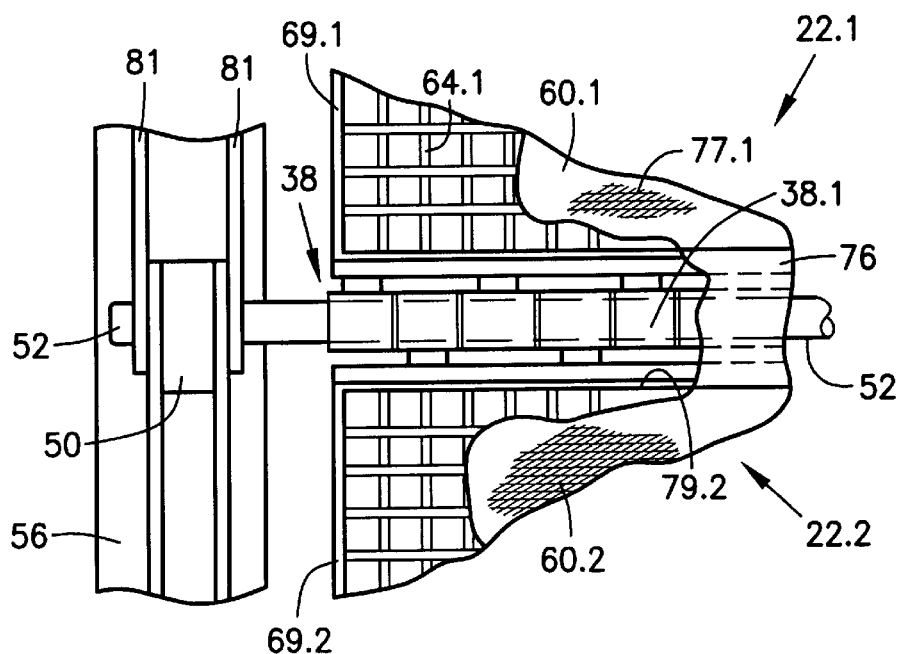
FIG. 4 is a diagrammatic plan view, partially broken away of a junction region between two immediately adjacent separating pan assemblies of the separating assembly.
Figure 5:
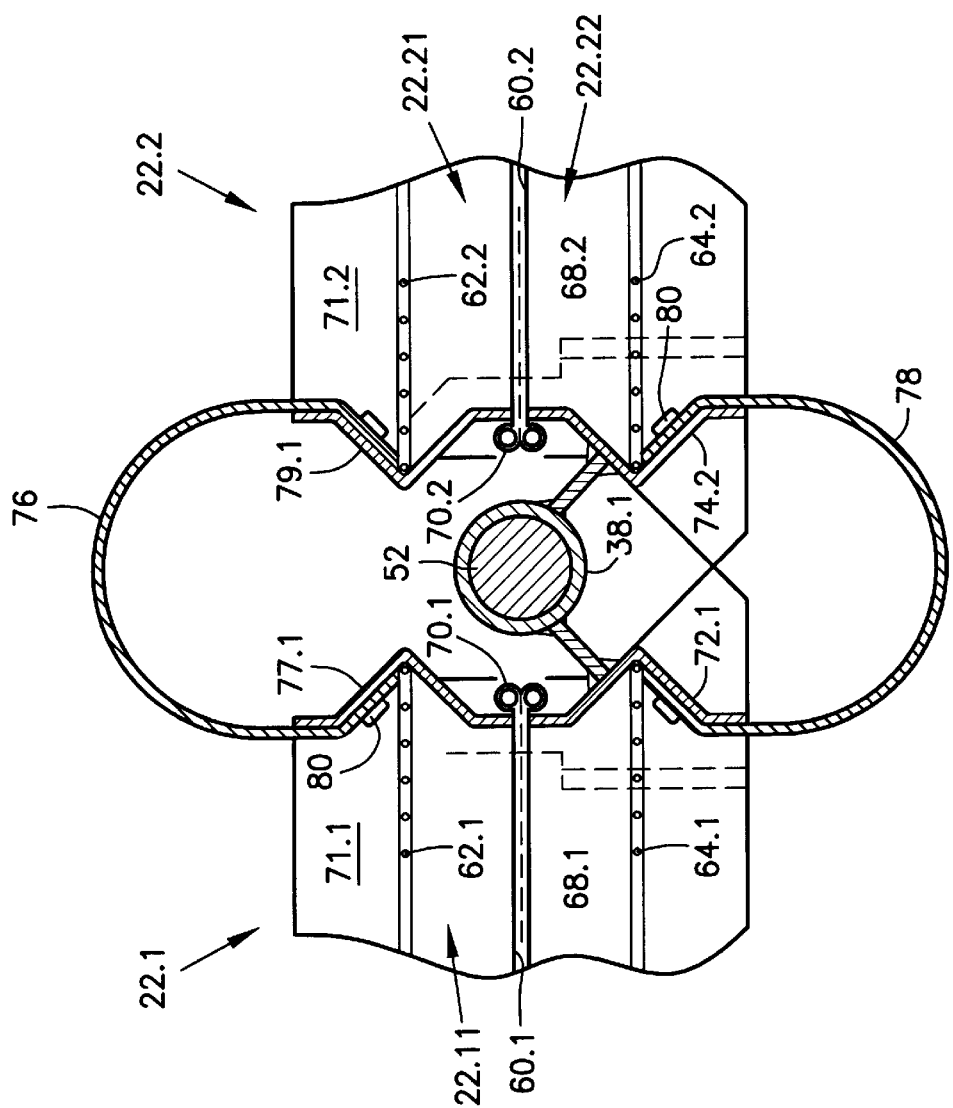
FIG. 5 is a section on line V in FIG. 2 of the junction region.
Figure 8:
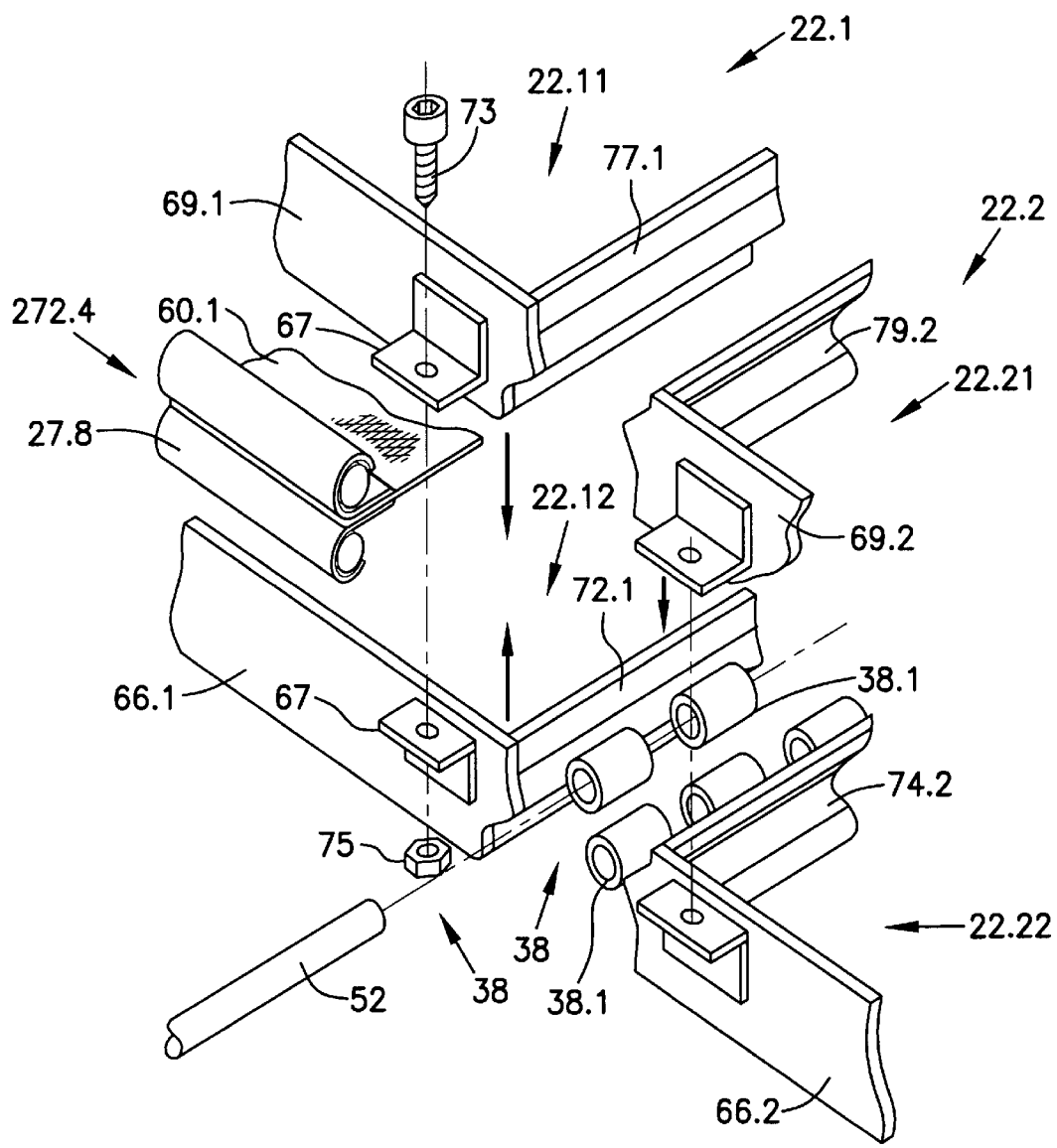
FIG. 8 is an exploded perspective view, partially broken away of adjacent pan assemblies in the junction region.
Figure 9:
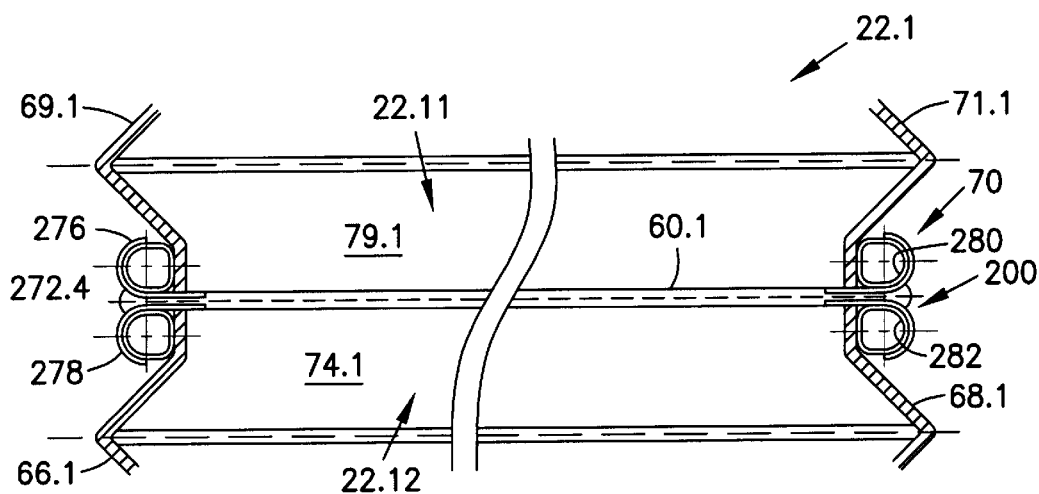
FIG. 9 is a section on line IX in FIG. 2.

As best shown in FIG. 8, first and second sidewalls of the pans 22.12 to 22.n2 are formed respectively by a first train of elongate stainless steel plates 66.1 to 66.n articulated to one another in the junction regions 24 by piano hinges 38 and a transversely spaced second train of articulated plates 68.1 to 68.n (of which plates 68.1 and 68.2 are shown in FIG. 5). The first side walls of the pans 22.11 to 22.n1 are formed by a train of elongate stainless steel plates 69.1 to 69.n secured to plates 66.1 to 66.n by lugs 67, bolts 73 and nuts 75. Side walls 69.1 and 69.2 of pans 22.11 and 22.21 are also shown in FIG. 4. The second side walls of pans 22.11 to 22.n1 are formed by transversely spaced train of plates 71.1 to 71.n (plates 71.1 and 71.2 of which are shown in FIG. 5) similarly secured to corresponding plates 68.1 to 68.n. The relationship of first side walls 66.1 and 69.1 of pans 22.12 and 22.11 and the opposed second side walls 68.1 and 71.1 is best illustrated in FIG. 9.

Referring again to FIG. 8, the side walls 66.1 and 68.1 of pan 22.12 are welded to stainless steel leading end wall 72.1 and a stainless steel trailing end wall (not shown). However, the corresponding trailing end wall 74.2 of pan 22.22 is shown in FIG. 8. Similarly, the side walls 69.1 and 71.1 of pan 22.11 are welded to stainless steel leading end wall 77.1 and a stainless steel trailing end wall (not shown). However, corresponding trailing end 79.2 of pan 22.21 is also shown in FIG. 8. Barrels 38.1 of hinge 38 are welded to immediately adjacent end walls, such as end walls 72.1 and 74.2. The shaft of the hinge 38 is constituted by the axle 52.

Each fine screen segment 60.1 to 60.n is mounted in a rectangular frame (shown in FIG. 5 at 70.1 and 70.2 in respect of the fine screen segments 60.1 and 60.2 of pan assemblies 22.1 and 22.2). The coarse screen segments 62.1 to 62.n and 64.1 to 64.n are more rigid and do not require a frame. The segments 60.1 to 60.n with frames are removable from the separating assembly when the back-to-back pans are removed from one another by removing bolts 73 and nuts 75.

The fine screen mesh segments 60.1 to 60.n may be chosen to pass particles of a size equal to and smaller than 300 microns or less. The coarse screen mesh segments 62.1 to 62.n and 64.1 to 64.n primarily serve to protect the intermediate fine screen mesh segments 60.1 to 60.n.

As shown in FIGS. 5 and 6, immediately adjacent end walls of adjacent pan assemblies, such as walls 77.1 and 79.2 on the one hand and walls 72.1 and 74.2 on the other, are joined at their top and bottom edges respectively by flexible elongate and transversely extending curved covers 76 and 78 respectively. The covers 76,78 are secured by screws 80.

Figure 7:
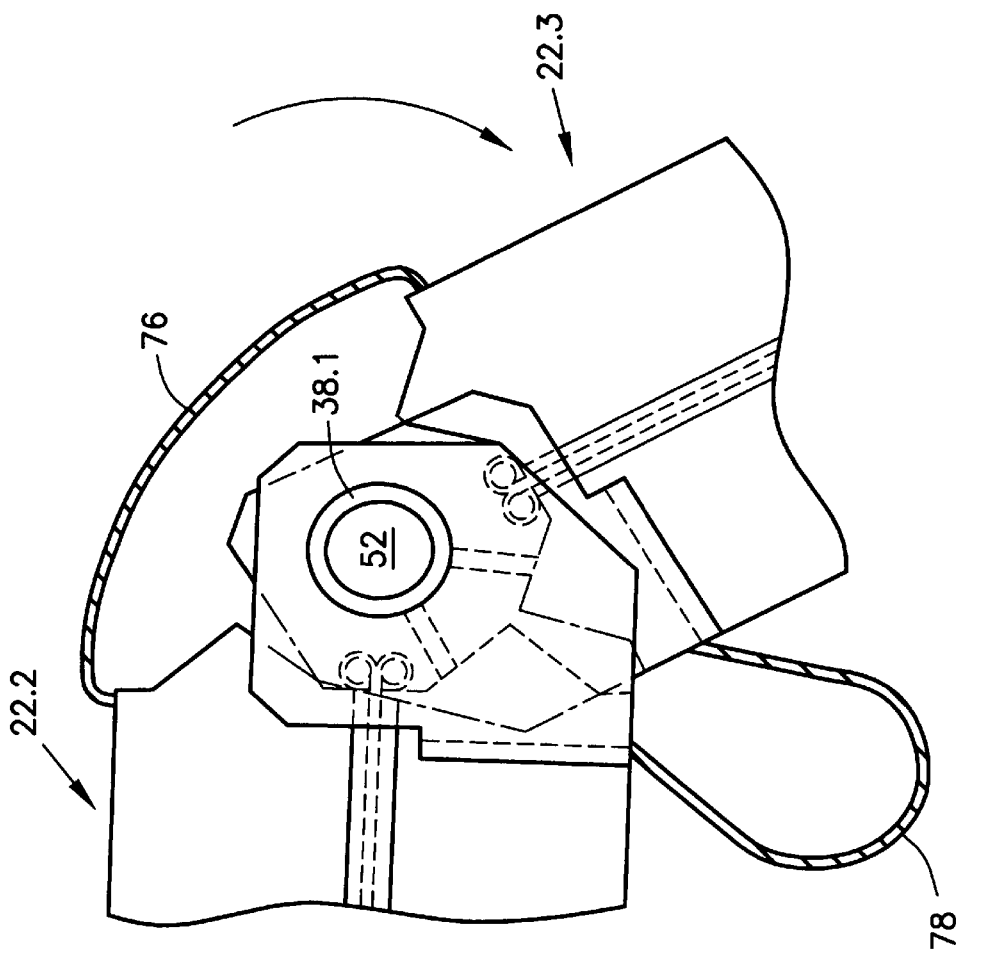
FIG. 7 is a section similar to that of FIG. 5 of the junction region illustrating its deformation as it moves about the sprocket assembly.

In FIGS. 6 and 7, pan assemblies 22.2 and 22.3 when on sprocket assembly 16, are shown in more detail. The sprocket assemblies 14 and 16 are designed such that the rigid pan assemblies as hereinbefore described are not deformed during their motion about the sprocket assemblies, but that the junction regions and more particularly the covers 76 and 78 deform to accommodate changes in direction of the separating assembly 20 about the sprocket assemblies.

It is believed that this feature and the aforementioned configuration of rigid pan assemblies 22.1 to 22.n articulated to one another facilitate the use of mesh segments 66.1 to 66.n made of stainless steel and also the use of very fine screen segments which may stop particles of an even smaller size than the aforementioned 300 microns.

As best shown in FIGS. 2 and 6 adjacent axles 52 of the separating assembly 20 are linked by transversely spaced chains 81 and 83. The wheels 50 are engaged in the notches of sprocket assemblies 14 and 16.

The fine screen mesh segments 60.1 to 60.n may be provided in modular form and the modular unit may also include tightening means for the segment.

Figure 10:
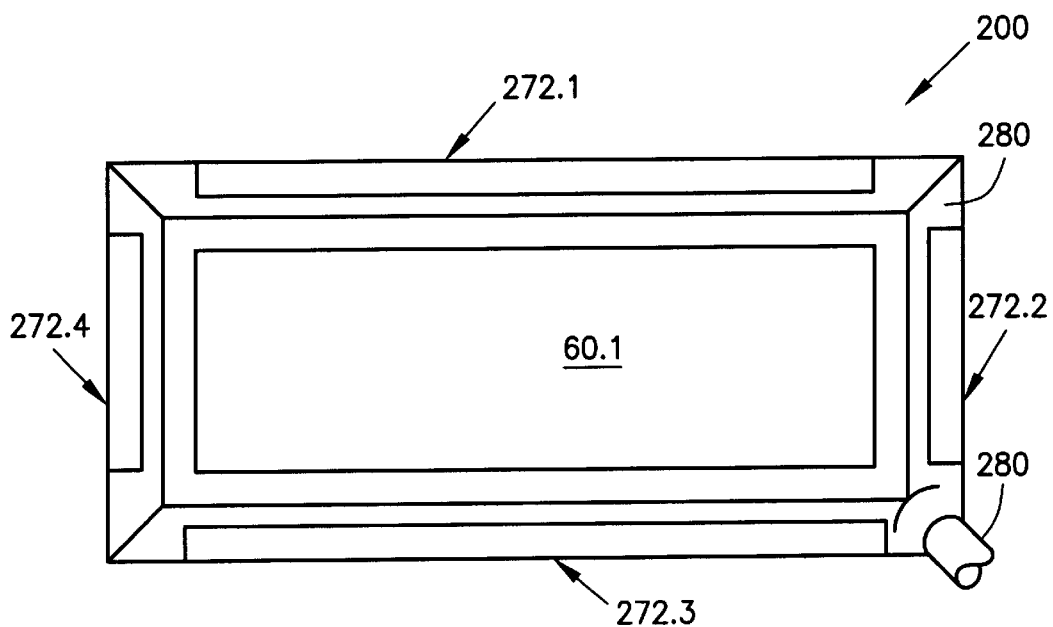
FIG. 10 is a diagrammatic plan view of a modular screen unit forming part of the separator.

A modular unit 200 is shown in FIGS. 9 and 10. The unit 200 includes the fine screen segment 60.1 and a frame 70.1 including inwardly curved elongate hook pairs 272.1 to 272.4 welded or glued along opposed ends and opposed sides of the segment 60.1. The hook pairs are substantially identical in configuration and only pair 272.4 will be described in more detail. Pair 272.4 includes first and second opposed elongate hooks 276 and 278 mounted back-to-back on the segment 60.1. Endless inflatable tubes 280 and 282 are located in the channels defined by the first hooks and the second hooks respectively of each pair of hooks.

To insert the modular unit 200 into pan assembly 22.1 of the separating assembly 20, a sub-assembly including side walls 69.1 and 71.1 and end walls 77.1 and 79.1 is removed as hereinbefore described from the assembly including walls 66.1, 68.1, 72.1 and 74.1. The modular unit 200 is inserted with the hook shaped formations at the ends thereof located in the junction regions 24 (as shown in FIG. 5) and the hook shaped formations along the sides thereof beyond the side walls 66.1 and 68.1, as shown in FIG. 8. Thereafter, the aforementioned assembly including side walls 68.1 and 70.1 and end walls 72.1 and 74.1 is returned and bolted to the assembly including side walls 66.1 and 68.1 as hereinbefore described. The tubes 280 and 282 are inflated to straighten and tighten the screen segment 60.1 in the pan assembly 22.1.

In use, the mixture is fed onto the separating assembly 20 at both inlets 26 and 28 simultaneously and the sprocket assembly 16 is driven to cause the separating assembly 20 to move along the trajectory in direction C. The mixture in the upwardly facing pans in the top and bottom sections of the trajectory is agitated by the aforementioned undulating tracks and the sprayers 82 and 84. Particles of the first solid in the mixture introduced at 26 move through upper course screen mesh segments through the fine screen mesh segments and the bottom course screen mesh segments of the pan assemblies in the top run into the sump arrangement 30 and 32. These particles are drained via outlets 30.1 and 32.1. Similarly, particles of the first solid in the mixture introduced at 28 move through the upper coarse screen mesh segments, through the fine screen mesh segments and the bottom coarse screen mesh segments of the pan assemblies in the return run, into sump arrangement 34 and 36. These particles are drained via outlets 34.1 and 36.1.

The upwardly facing pans in the top section A of the trajectory are cleaned by sprayers 86 and the particles which are larger than the first particle size are collected in first collection region 42 and drained via outlet 44. The aforementioned upwardly facing pans are cleaned in the aforementioned manner before they enter the bottom section B, where they face downwardly.

Similarly, the upwardly facing pans in the bottom section B of the trajectory are cleaned by sprayers 88 and the particles which are larger than the first particle size are collected in second collection region 46 and drained via outlet 48. Thus, these upwardly facing pans are cleaned in this manner before they enter the top section A of the trajectory, where they face downwardly.

In the second embodiment of the separator according to the invention designated 110 in FIGS. 11 to 16, the sprocket assembly 14 is substituted by a smooth, curved and stationary guide assembly 114.

Figure 11:
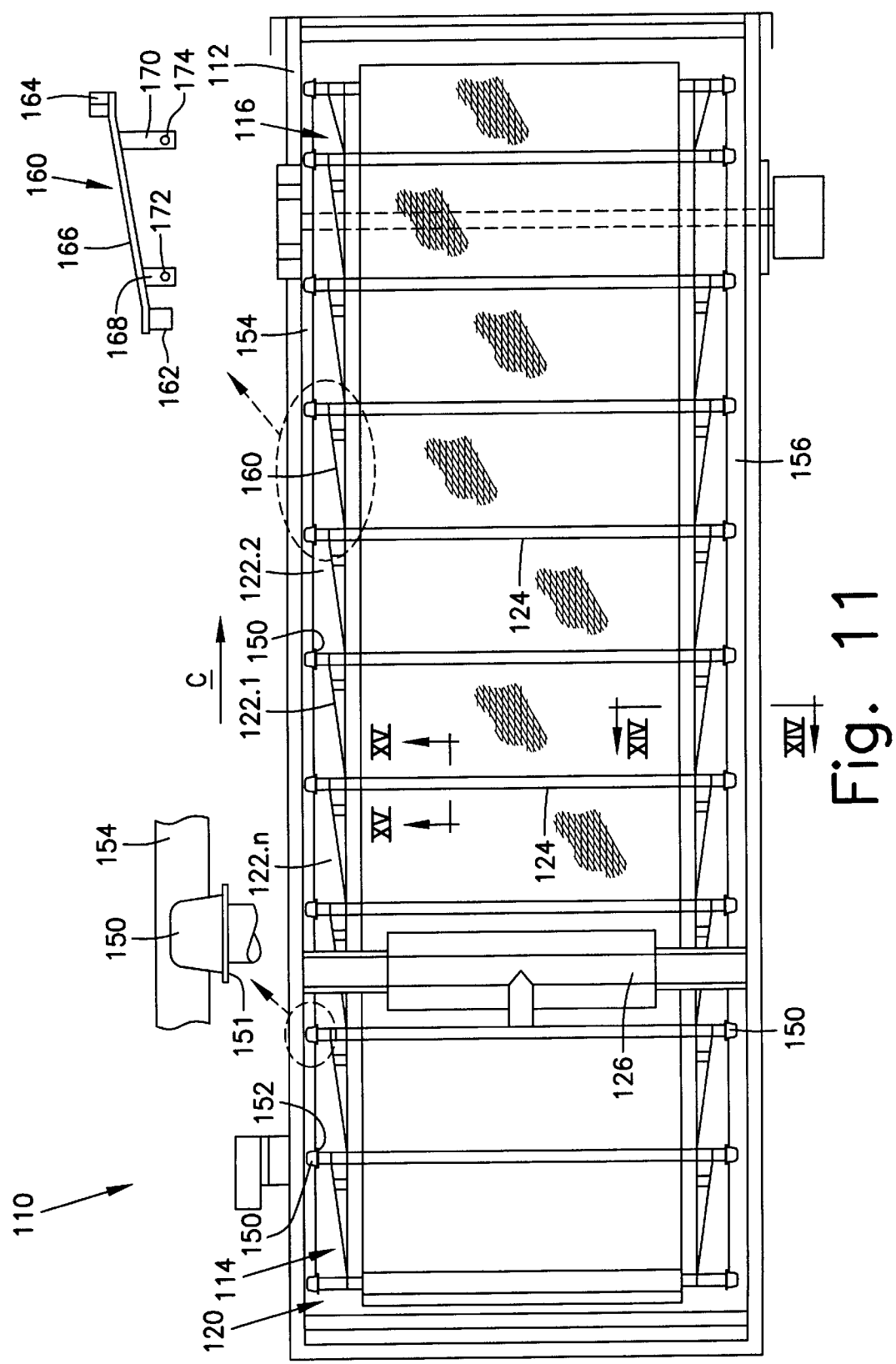
FIG. 11 is a diagrammatic plan view of a second embodiment of the separator with parts thereof enlarged for greater clarity.

The sprocket assembly 116 and guide assembly 114 of the separator 110 shown in FIG. 11 support a separating assembly 120 comprising a continuous train of articulated and similar separating pan assemblies 122.1 to 122.n, each comprising back-to-back pans separated by a common discrete screening segment. The sprocket assembly 116 is driven by an electric motor to cause the separating assembly to follow in a clockwise direction C a closed trajectory similar to that of the separator assembly 20 described hereinbefore.

As best shown in FIG. 11, the pan assemblies 122.1 to 122.n are separated by similar junction regions 124. The junction region is shown in more detail in FIG. 15 and will be described hereinafter.

The frame 112 of the separator 110 further supports a first feeding and distribution arrangement 126 for the mixture to be separated, mounted above the top section A of the trajectory and a second feeding and distribution arrangement (not shown) for the mixture located between the top section A and the bottom section B of the trajectory. The first and second arrangements are similar in configuration and therefore only arrangement 126 will be described in more detail with reference to FIG. 13. Feeding and distribution arrangement 126 comprises an elongate housing 121 extending transversely to the frame 112. The housing has an open bottom. An inlet conduit 123 communicates with an elongate distribution conduit 125 located in the housing. A plurality of outlet ports 127 are defined in longitudinally spaced relation in the conduit 125. An inverted V-shaped deflector 129 is provided in housing 121, to provide parallel elongate outlet passages 131 and 133 onto the separating assembly 120.

Figure 12:
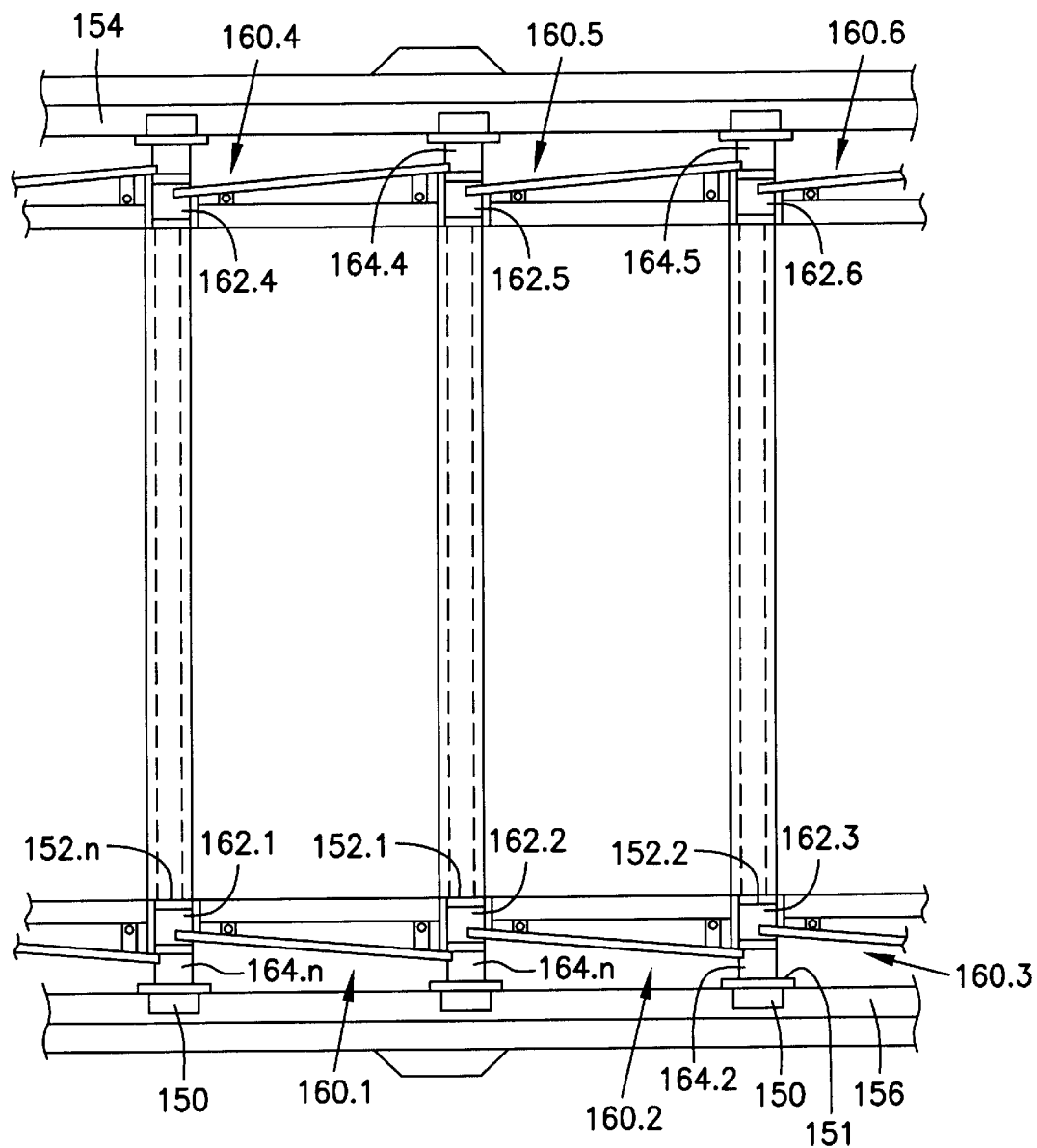
FIG. 12 is a part of FIG. 11 enlarged for better clarity.
Figure 13:
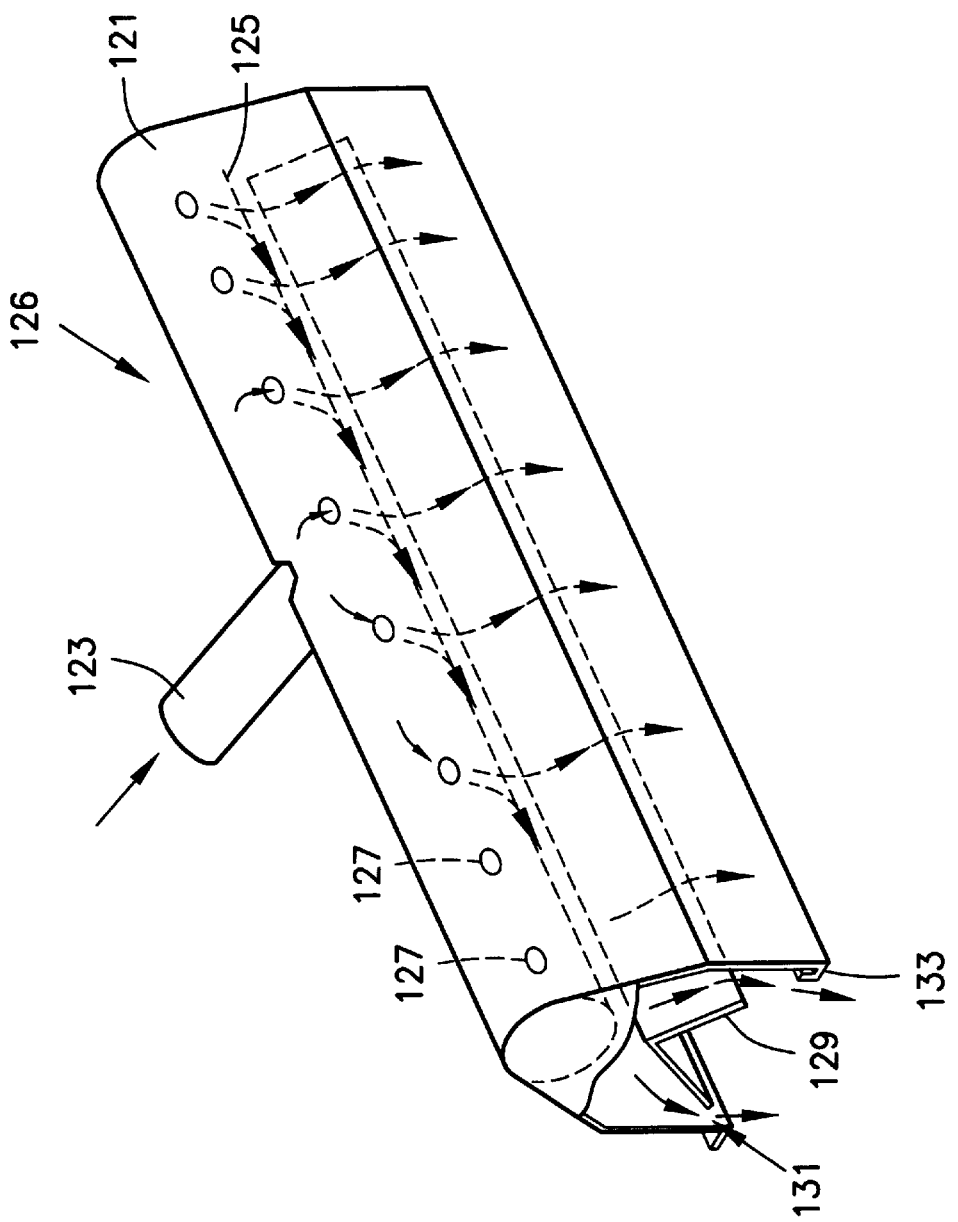
FIG. 13 is a diagrammatic perspective view of a feeder for feeding onto the separating assembly of the separator a mixture from which particles are to be separated.

Referring again to FIG. 11, the separating assembly 120 is supported on the frame 112 by a continuous train of spaced wheel pairs 150 interconnected by a continuous train of axles 152. Each wheel 150 has an integral peripheral flange 151 on the inside thereof (as best shown in FIGS. 11, 12, 14 and 16) and run in the top section A of the trajectory on a pair of first and second transversely spaced upper track elements 154, 156 provided on the frame 112 as shown in FIGS. 11 and 12. In the bottom section B of the trajectory the wheels run on a similar pair of spaced first and second lower track elements. The wheels and axles are transferred from the upper track elements 154, 156 to the bottom track elements by the sprocket assembly 116 defining notches for engaging the axles 152. At the outer end of the trajectory the wheels and axles are transferred from the bottom track elements to the upper track elements by guide assembly 114 providing transversely spaced semi-circular paths for the flanged wheels 150.

Adjacent axles in the train of axles 152 are interconnected as shown in FIG. 11 by link elements 160, one of which is also shown in enlarged form in FIG. 11. Each link element includes first and second bushes 162 and 164 extending on opposite sides of a slanting elongate element 166. On the elongate element there are provided first and second lugs 168 and 170 defining apertures 172 and 174 respectively.

As shown in FIG. 12, adjacent axles 152.1 and 152.2 are interconnected by two transversely spaced link elements 160.2 and 160.5. Bushes 162.2 and 162.5 of link elements 160.2 and 160.5 are located longitudinally inwardly on axle 152.1 relative to bushes 164.1 and 164.4 of link elements 160.1 and 160.4 extending from a trailing axle 152.n. Bushes 164.2 and 164.5 of link elements 160.2 and 160.5 are located longitudinally outwardly an axle 152.2 relative to bushes 162.3 and 162.6 of link elements 160.3 and 160.6 extending to the next axle in the train of axles. The bushes are rotatable relative to the axles on which they are mounted.

Figure 14:
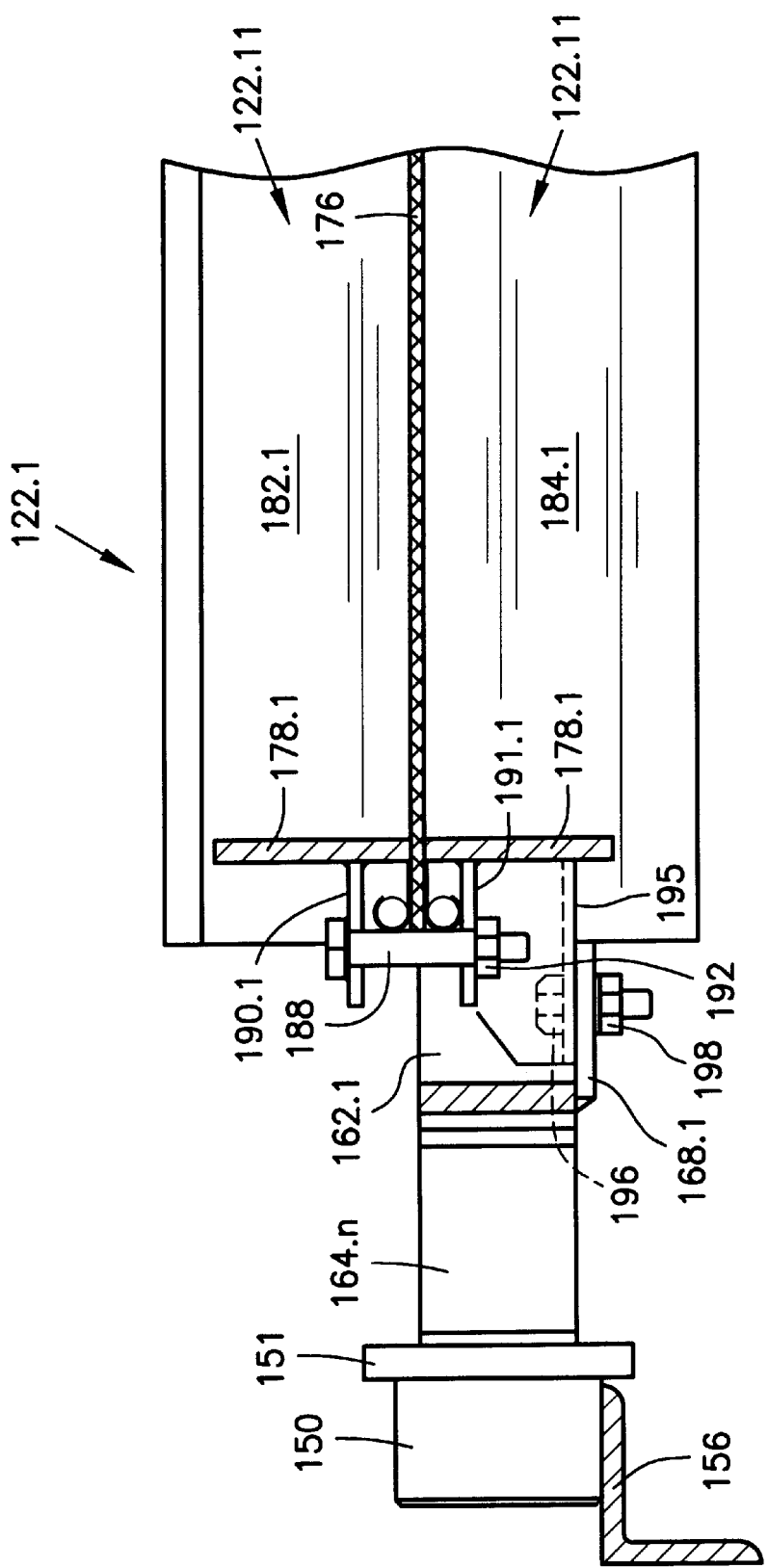
FIG. 14 is a section on line XIV in FIG. 11 illustrating back-to-back pans of a pan assembly forming part of the separating assembly.
Figure 15:
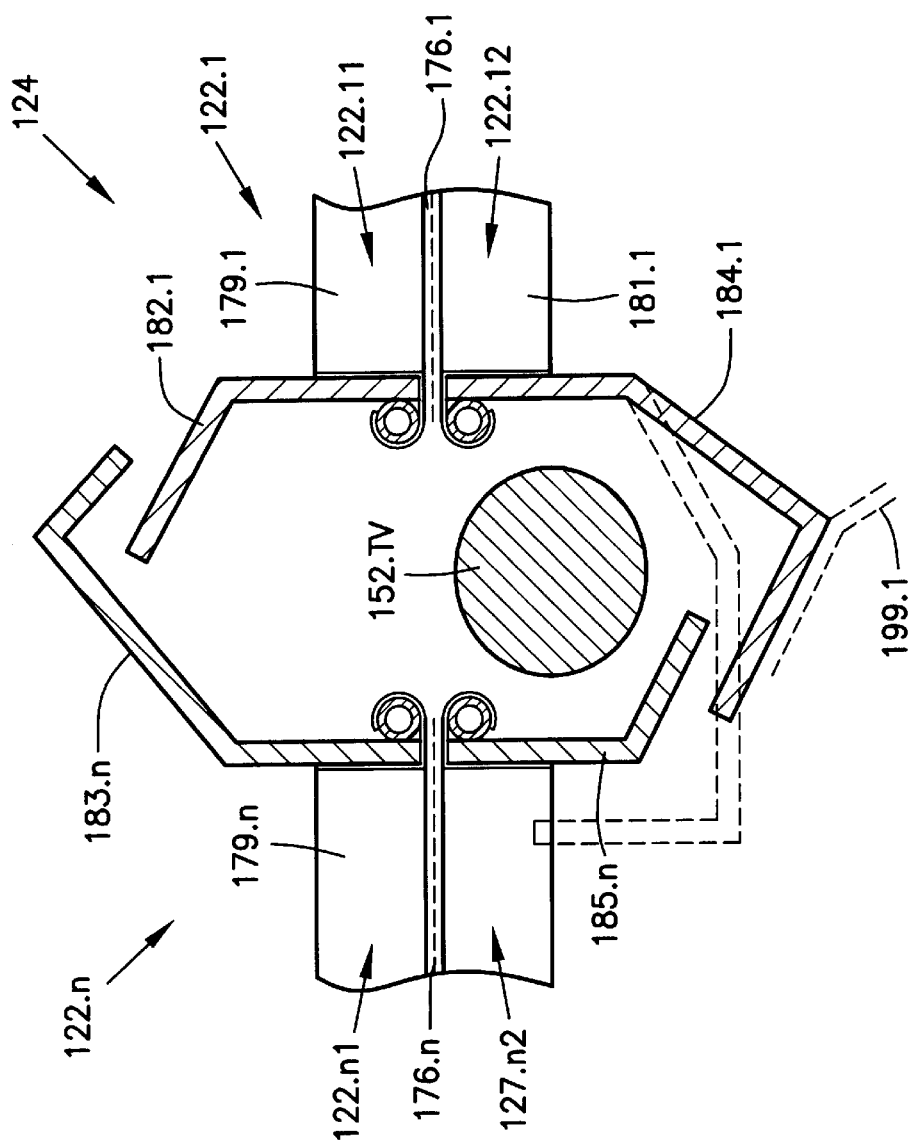
FIG. 15 is a section on line XV in FIG. 11 illustrating a junction region between two adjacent pan assemblies.

As stated hereinbefore the pan assemblies 122.1 to 122.n are similar in configuration. Accordingly, only pan assembly 122.1 will be described in further detail. As shown in FIGS. 14 and 15 pan assembly 122.1 comprises first and second back-to-back pans 122.11 and 122.12 facing in opposite directions and separated by a common, but discrete first and fine stainless steel screen mesh segment 176.1.

Figure 16:
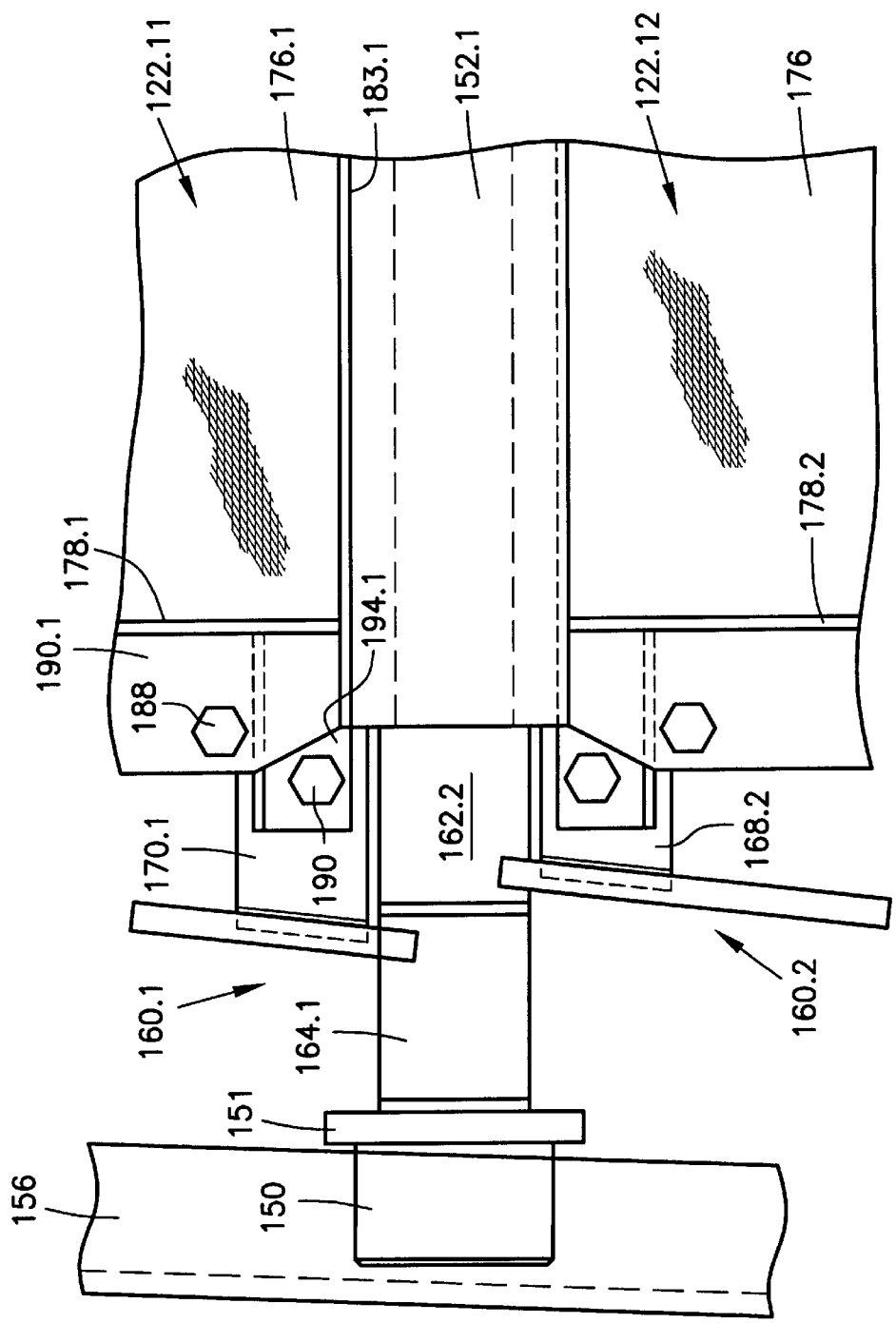
FIG. 16 is a partial plan view of the junction region between two adjacent pan assemblies.

Pan 122.11 includes transversely spaced side walls 178.1 and 179.1 shown in FIGS. 14, 16 and 15 respectively, whereas pan 122.12 includes transversely spaced side walls 180.1 and 181.1, shown in FIGS. 14 and 15 respectively. Sidewalls 178.1 and 179.1 are welded at their trailing ends to an end wall 182.1 shown in FIGS. 14 and 15. At their leading ends they are welded to an end wall 183.1 shown in FIG. 16. Similarly, side walls 180.1 and 181.1 are welded at their trailing ends to end wall 184.1 shown in FIGS. 14 and 15 and at their leading ends to an end wall corresponding to end wall 185.n shown in FIG. 15. As shown in FIG. 14, the side walls 178.1 and 180.1 of pan assembly 122.1 are bolted together towards both their ends by bolts 188 extending between elongate flanges 190.1 and 191.1 welded to the side walls respectively and cooperating nuts 192. Transversely opposed side walls 179.1 and 181.1 of pan assembly 122.1 are similarly secured together. Screen segment 176.1 is sandwiched between one walls 178.1 and 180.1 on the one side thereof, between side walls 179.1 and 181.1 on the other side thereof and between the opposed end walls of the pan assembly.

Referring to FIGS. 14 and 16, towards both ends of side wall 180.1 and both ends of transversely spaced side wall 181.1 there are provided outwardly extending lugs. For example, a lug 194.1 welded to side wall 180.1 towards the leading end thereof is shown in FIG. 16 and a lug 195.1 welded to side wall 180.1 towards the trailing end thereof is shown in FIG. 14. These lugs abut against and are secured by bolts 196 and cooperating nuts 198 to the aforementioned lugs 168 and 170 on the links 160. For example and as shown in FIG. 16, lug 194.1 is bolted to lug 170.1 on link 160.1. Similarly, lug 195.1 towards the trailing end of side wall 178.1 is bolted to lug 168.1 on link 160.1. Thus, in the top section A of the trajectory, the pan assemblies are supported on the train of link elements and in the bottom section B of the trajectory the pan assemblies are suspended from the train of link elements. As explained hereinbefore, the link elements 160 are carried by the wheeled axles 152 which in turn are supported by the aforementioned pairs of track elements provided on the frame 112.

As best shown in FIG. 15, transversely extending weir elements 199.1 to 199.n are mounted on end walls 184.1 to 184.n. The weir elements 199.1 to 919.n prevent the contents of the upper pans in section B of the trajectory from moving backwardly into a trailing pan while the pans move upwardly about guide assembly 114.

Figure 17:
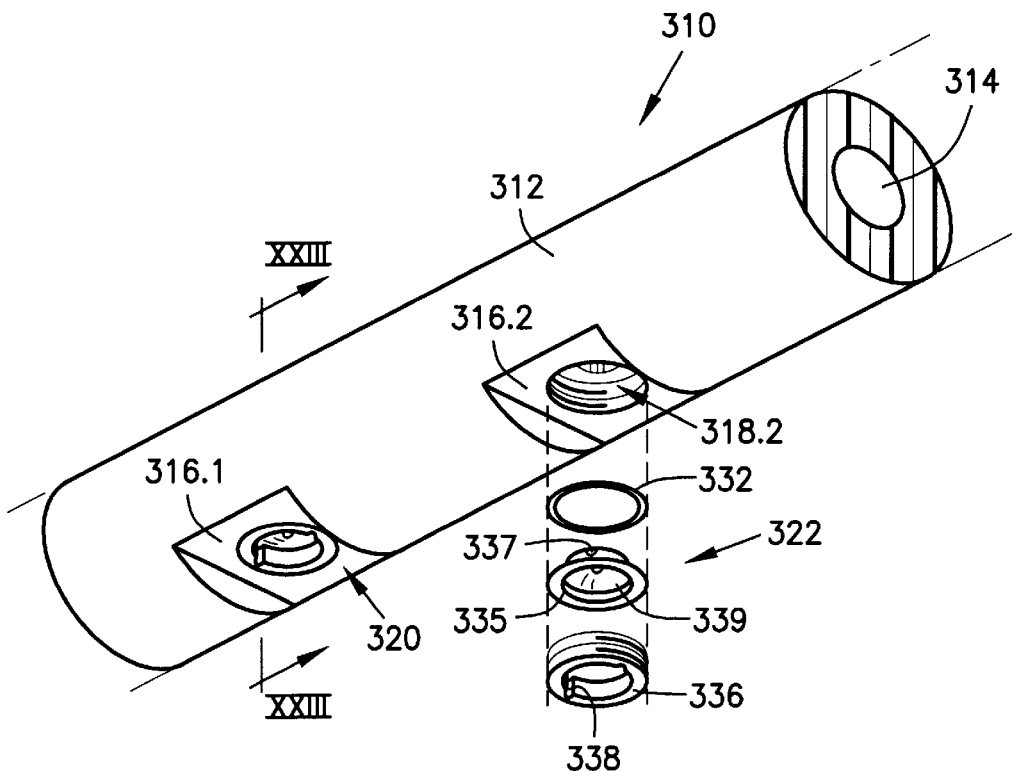
FIG. 17 is a diagrammatic oblique view of a spray bar forming part of the separator.
Figure 18:
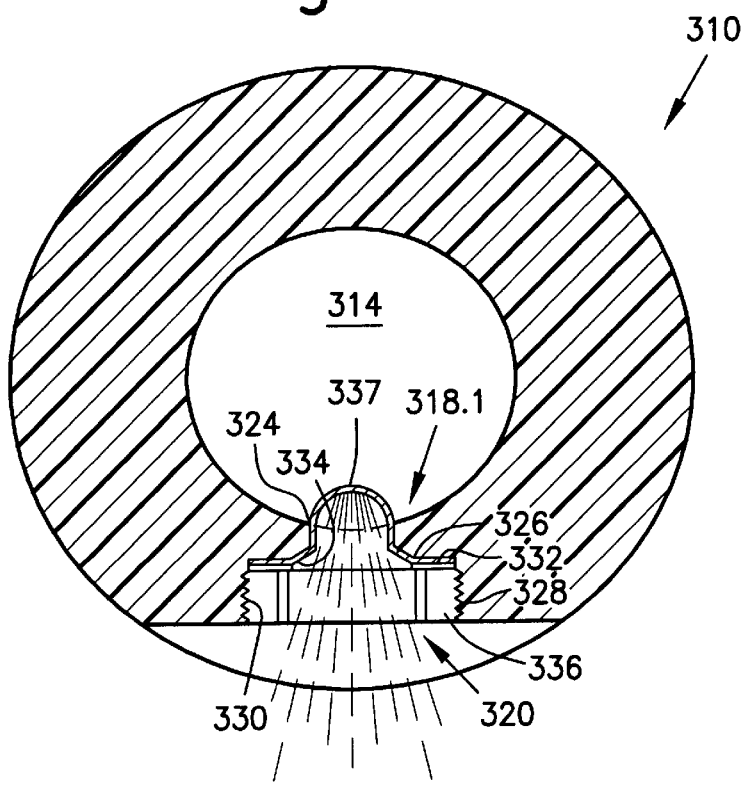
FIG. 18 is a section on line XVIII in FIG. 17.

The sprayers referred to hereinbefore may be provided on a spray bar, such as that shown at 310 in FIGS. 17 and 18.

The spray bar 310 comprises a conduit 312 made of a suitable resinous material, such as high density polyethylene or high density polypropylene. The conduit defines a circular bore 314 with a diameter typically in the order of 35 mm and the thickness of the side wall is typically in the order of 20 mm.

Spaced longitudinally along the conduit 312 there are provided a plurality of regions 316.1 and 316.2 wherein the outer surface of the conduit is flattened. In each flattened region there is defined an outlet port 318.1 and 318.2 from the conduit. The outlet ports 318.1 and 318.2 are fitted with nozzle assemblies 320 and 322 respectively. The outlets and nozzle assemblies are identical in configuration and reference will be made to both nozzle assemblies 320 and 322 in the description hereinafter.

The outlet port includes a first and inner region 324 communicating with the bore 314 and having a first diameter. The first region 324 is separated by an outwardly flaring shoulder 326 from a second and outer region 328, which has a second diameter which is larger than the aforementioned first diameter. The side wall of the outer region 328 is provided with an internal thread 330.

The nozzle assembly 320 includes an o-ring 332 seating against the shoulder 326 and a cup-shaped nozzle 334 defining an orifice 337 in a base region of the cup and an outlet 339 in an opposite region thereof. A peripheral flange 335 circumscribes the outlet. The nozzle is mounted in the port with the flange sandwiched between the o-ring 332 and an externally threaded locking nut 336 cooperating with the thread 330. The locking nut 336 defines diametrically opposed slots 338 for receiving a tool for screwing the nut into the wall.

The nozzle assembly is thus recessed into the side wall of the conduit. It does not extend beyond the outer surface of the conduit, but extends into the bore to withdrew water from a region inwardly from a region immediately adjacent the side wall. The nozzle assemblies are easily and individually locatable in and removable from the side wall. No welding is required and nozzle assemblies may be replaced with the bar 310 in its normal operational position.

It is believed that liquid flow through the resinous conduit may be superior to that through the known conduits. Furthermore, it is also believed that the liquid is deposited more evenly than with the known spray bars and that the nozzles may not become clogged as quickly as is the case with the known spray bars.

It will be appreciated that there are many variations in detail on the separator, separating assembly, modular screen unit, spray bar and method according to the invention without departing from the scope and spirit of the appended claims.

What is claimed is:

1. A separator for separating out a first solid particulate component from a mixture thereof with a second solid particular component which is of bigger particle size than the first solid particulate component, the separator comprising:
- a separating assembly comprising an articulated train of classifiers moving along a closed trajectory having a first section and a second section;
- each classifier comprising a first classifying element for allowing the first particulate component therethrough and for stopping the second particulate component;
- a first mixture feeding means provided on one side of the first section for feeding the mixture onto the separating assembly;
- a first receiving means provided on another side of the first section for receiving the first solid particulate component;
- a second mixture feeding-means provided on one side of the second section for feeding the mixture onto the assembly;
- a second receiving means provided on another side of the second section for receiving the first solid particulate component; and
- a first collection region located downstream along the trajectory from the first mixture feeding means, for receiving the second solid particulate component.

2. A separator as claimed in claim 1 wherein the train of classifiers is mounted to move about first and second spaced support assemblies, so that the first section is an elongate section extending from the first assembly to the second assembly; and the second section is an elongate section extending from the second assembly to the first assembly.

3. A separator as claimed in claim 2 wherein the first support assembly comprises one of a sprocket assembly and a guide assembly; and wherein the second support assembly comprises a sprocket assembly.

4. A separator as claimed in claim 2 wherein the separating assembly is mounted on a rectangular frame supporting the support assemblies, so that the first and second sections extend parallel to one another with the first section above the second section.

5. A separator as claimed in claim 4 wherein the frame of the separator comprises first and second tracks extending along said first and second sections respectively of the trajectory, each track comprising transversely spaced longitudinally extending first and second elongate track elements and the separator assembly being supported on the tracks by spaced wheels mounted on a continuous train of axles.

6. A separator as claimed in claim 5 wherein each track element provides undulations thereon and wherein the undulations on the first track element of each track is preferably out of phase with the undulations of the second track element of that track, thereby to rock the separating assembly and agitate the mixture thereon, in use.

7. A separator as claimed in claim 5 wherein adjacent axles in the continuous train of axles are linked to one another by link elements extending between the adjacent axles.

8. A separator as claimed in claim 7 wherein first and second link elements are provided between end regions of first and second adjacent axles to link the end regions thereof, each link element comprising first and second bushes towards first and second ends thereof for respectively receiving said first and second axles.

9. A separator as claimed in claim 4 wherein the frame of the separator further comprises agitating sprayers along the first and second sections for agitating the mixture on the separating assembly.

10. A separator as claimed in claim 4 wherein the frame of the separator comprises sprayers in the vicinity of the first and second collection regions, to wash the second solid component off the assembly and into said first and second collection regions.

11. A separator as claimed in claim 2 wherein the first mixture feeding means is provided towards the first support assembly and wherein the first receiving means comprises a plurality of transversely removable modular sumps provided between the first section and the second section.

12. A separator as claimed in claim 2 wherein the second mixture feeding means is provided towards the second support assembly; and wherein the second receiving means comprises a plurality of transversely removable modular sumps provided below the second section.

13. A separator as claimed in claim 12 wherein the mixture, in use, is fed via the first and second mixture feeding means simultaneously, so that it is screened in either of the first and second sections of the trajectory and so that the first particulate component is received in either of the first and second sump arrangements.

14. A separator as claimed in claim 1 wherein at least one of the first mixture feeding means and the second mixture feeding means comprises an elongate conduit defining a plurality of outlet ports spaced along the length thereof.

15. A separator as claimed in claim 14 wherein the conduit is housed in an elongate housing having an open bottom and wherein an inverted V-shaped deflector is mounted in the housing below the conduit, so that outlet channels onto the separating assembly are defined on either side of the deflector.

16. A separator as claimed in claim 1 wherein each classifier in the train of classifiers comprises a pan assembly including first and second back-to-back pans separated by the first classifying element.

17. A separator as claimed in claim 16 wherein the first classifying element of each pan assembly comprises a fine screen segment.

18. A separator as claimed in claim 17 wherein each of the first and second pans of each pan assembly further comprises a coarser screen segment spaced from said first fine screen segment and extending substantially parallel to said first fine screen segment.

19. A separator as claimed in claim 11 wherein the pan assemblies of the train of pan assemblies are separated by transversely extending junction regions.

20. A separator as claimed in claim 19 wherein the first fine screen segment of each pan assembly forms part of a modulator screen unit which is removably receivable between two adjacent junction regions.

21. A separator as claimed in claim 20 wherein the modular screen unit comprises the first fine screen segment and tightening means for the first fine screen segment secured to the first fine screen segment and manipulatable to cooperate with a wall of the pan assembly to tighten the first fine screen segment.

22. A separator as claimed in claim 21 wherein the tightening means comprises at least one elongate curved hook formation secured to a peripheral region of the segment and at least one inflatable member locatable in a channel defined by the elongate hook formation so that, in use, the inflatable member is located between the hook formation and the wall of the pan assembly and so that upon inflation of the inflatable member, the segment is tightened in the pan assembly.

23. A separator as claimed in claim 16 wherein the first and second pans respectively of each pan assembly comprise transversely spaced first and second side walls, the first side wall of the first pan being removably secured to the first side wall of the second pan and the second side wall of the first pan being removably secured to the second side wall of the second pan.

24. A separator as claimed in claim 23 wherein the first and second side walls of the first pan and the first and second side walls of the second pan are permanently secured at their respective ends to respective transversely extending leading and trailing end walls of the first and second pans.

25. A separator as claimed in claim 24 wherein the leading end walls of the first and second pans of each pan assembly and the trailing end walls of the first and second pans of an adjacent pan assembly collectively form a junction region between the adjacent pan assemblies and wherein an axle of the train of axles for supporting the separating assembly on the frame also forms part of each junction region.

26. A separator as claimed in claim 24 wherein a transversely extending weir element is secured to the trailing end wall of each second pan of each pan assembly.

27. A separator as claimed in claim 23 wherein the first and second side walls of the second pan of each pan assembly are removably secured to the link elements thereby to secure the separator assembly to the link elements.

28. A separator as claimed in claim 27 wherein flanges on the first and second side walls of the second pan of each pan assembly are secured to flanges on the link elements.

29. A separator for separating out a first solid particular component from a mixture thereof with a second solid particulate component which is of bigger particle size than the first solid particulate component; the separator including:

a continuous separating assembly moving along a closed trajectory and having a top run and return run;

the separating assembly including classifier means for allowing the first particulate component therethrough and for stopping the second particulate component;

a first mixture feeding means for feeding the mixture onto a top surface of the top run of the assembly;

a first receiving means located below a bottom surface of the top run for receiving the first particulate component;

a second mixture feeding means for feeding the mixture onto a top surface of the return run of the assembly; and a second receiving means located below a bottom surface of the return run.

30. A separator as claimed in claim 29 including a first collection region for the second particulate component located downstream along the trajectory from the first mixture feeding means and a second collection region for the second particulate component located downstream along the trajectory from the second mixture feeding means.

31. A separator as claimed in claim 29 wherein the separating assembly includes a continuous train of articulated classifiers, each classifier including a first classifying element for allowing the first particulate component therethrough and for stopping the second particulate component.

32. A method of separating out a first solid particulate component from a mixture thereof with a second solid particulate component which is of bigger particle size than the first solid particulate component, the method including the steps of:

providing a continuous separating assembly for passing the first particulate component and for stopping the second particulate component;

causing the assembly to travel along a closed trajectory so that it follows a first run and a return run;

from a first feeding means above the first run, feeding the mixture onto the assembly and collecting the first solid component between the first run and the return run;

collecting the second solid component downstream from the first feeding means;

at the same time and from a second feeding means between the first run and the return run, also feeding the mixture onto the assembly and collecting the first solid component on another side of the return run; and collecting the second solid component downstream from the second feeding means.

\* \* \* \* \*

UNITED STATES PATENT AND TRADEMARK OFFICE
CERTIFICATE OF CORRECTION

| | | |
|---|---|---|
| PATENT NO. | : 6,223,905 B1 | Page 1 of 1 |
| DATED | : May 1, 2001 | |
| INVENTOR(S) | : Reindert Buisman et al. | |

It is certified that error appears in the above-identified patent and that said Letters Patent is hereby corrected as shown below:

Column 7,
Line 45, before "beyond" insert -- extending --.

Column 9,
Line 49, change "one" to -- side --.

Column 11,
Line 4, change "particular" to -- particulate --.

Column 12,
Line 46, change "claim 11" to -- claim 16 --.

Column 13,
Line 30, change "particular" to -- particulate --.

Signed and Sealed this

Seventh Day of May, 2002

Attest:

*Attesting Officer*

JAMES E. ROGAN
*Director of the United States Patent and Trademark Office*